US006496930B1

(12) United States Patent
Ono et al.

(10) Patent No.: US 6,496,930 B1
(45) Date of Patent: Dec. 17, 2002

(54) MESSAGE RECEIVING APPARATUS AND MESSAGE TRANSMITTING APPARATUS

(75) Inventors: Takatoshi Ono, Ama-gun (JP); Takeshi Saijo, Obu (JP); Makoto Tatebayashi, Takarazuka (JP); Syunji Harada, Osaka (JP); Yasuo Okumura, Moriguchi (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/215,533

(22) Filed: Dec. 18, 1998

(30) Foreign Application Priority Data

Dec. 18, 1997 (JP) .............................. 9-348939
Jul. 8, 1998 (JP) ............................. 10-193001

(51) Int. Cl.[7] ............................... G06F 1/24
(52) U.S. Cl. ................... 713/168; 713/170; 713/176
(58) Field of Search ................ 713/168, 170, 713/176–180, 181, 182

(56) References Cited

U.S. PATENT DOCUMENTS 5,412,721 A * 5/1995 Rager et al. ................ 380/21
5,481,610 A * 1/1996 Doiron et al. .............. 380/21
5,528,691 A * 6/1996 Rosauer et al. ............. 380/21
5,602,916 A * 2/1997 Grube et al. ............... 380/21
5,608,800 A   3/1997 Hoffmann et al.

FOREIGN PATENT DOCUMENTS

JP              470028          3/1992

* cited by examiner

Primary Examiner—Thomas R. Peeso
(74) Attorney, Agent, or Firm—Price and Gess

(57) ABSTRACT

A message receiving apparatus for receiving messages from a message transmitting apparatus generates first data for producing a display which urges a user of the message transmitting apparatus to input a message, and generates second data within the first data for specifying a conversion type for secret communication of the message. The message receiving apparatus sends the first data including the second data to the message transmitting apparatus and subsequently receives the message from the message transmitting apparatus. The message transmitting apparatus for transmitting messages to the message receiving apparatus receives the first data for producing the display and the accompanying second data for specifying the conversion type and produces the display according to the first data. On receiving the message inputted by the user in response to the display, the message transmitting apparatus converts the input message according to the second data and transmits the converted message to the message receiving apparatus.

17 Claims, 15 Drawing Sheets

FIG. 6

| CONTENTS / ENCRYPTION VARIABLE | ENCRYPTION METHOD | DIGITAL SIGNATURE METHOD |
|---|---|---|
| ONLY | RSA | — |
| MIC-CLEAR | — | PUBLIC KEY CRYPTOSYSTEM |
| ENCRYPTED | MyEllty-DES-CBC | MyEllty-SHA-1 |

| ATTRIBUTE INFORMATION | DOCUMENT NUMBER |
|---|---|
| 1 (MEMBER) | 0001 |
| 2 (VISITOR) | 0002 |

FIG. 11

```
<HTML>
<HEAD><TITLE>MESSAGE INPUT FORM</TITLE></HEAD>
<BODY>
<FORM method="post"action="cgi-bin/ui_input">
  <INPUT type="hidden"
         name="Proc-Type"value="ENCRYPTED">   501
  <INPUT type="hidden"
         name="Key"value="c0Qb28sgCW49TcbhA4BE">   502
Input your name :
<INPUT type="text"name="Name"value="">
Input your address :
<INPUT type="text"name="Address"value="">
Input your util.date :
<INPUT type="text" name="Date"value="">
<INPUT type="submit"value="Send Your Data">
</FORM>
</BODY>
</HTML>
```

FIG. 12

```
<HTML>
<HEAD><TITLE>MESSAGE INPUT FORM</TITLE></HEAD>
<BODY>
<FORM method="post"action="cgi-bin/ui_input">
  Input your name :
  <INPUT type="text"name="Name"value="">
  Input your address :
  <INPUT type="text"name="Address"value="">
  Input your util.date :
  <INPUT type="text" name="Date"value="">
  <INPUT type="submit"value="Send Your Data">
</FORM>
</BODY>
</HTML>
```

FIG. 15

Proc-Type=ENCRYPTED&Name=MATSUSHITA TARO&Address=NAGOYA&Date=1998.7.10 & Key=c0Qb28sgCW49TcbhA4BE 601 602 603 604 605

FIG. 16

```
<!-BEGIN Key-Info : alg="MyEllty-DES-CBC" ->
sf+kagvlakk40OTRLGVA×0/3iec9TK0ifd04V0IRV      ⎫
R0IEKieI0RDOK×KIjdaJEFJAJJKfjj4gdjgLKKD×5      ⎬ 651
<!-END Key-Info : ->
<!-BEGIN MIC-Info : alg="MyEllty-SHA-1" ->
smaoSDKc0asET+JkPDX/sas31ag×37QaczsdFKPDS      ⎫
Lsdaros7sJAs==                                 ⎬ 652
<!-END MIC-Info : ->
<!-Originator-ID : value="1234000000000001" ->
<!-BEGIN ENCRYPTED->
SDKMjpoj9u91q39c07jak+OKOFELSB/aivi01EAIG      ⎫
9ILC86943ITIVCLfk3dhqps4==                     ⎬ 653
<!-END ENCRYPTED->
```

MESSAGE RECEIVING APPARATUS AND MESSAGE TRANSMITTING APPARATUS

This application is based on applications Nos. 9-348939 and 10-193001 filed in Japan, the contents of which are hereby incorporated by reference.

BACKGROUND OF THE INVENTION

1. Field of the Invention

The present invention relates to a message receiving apparatus for receiving messages converted for secret communication, and a message transmitting apparatus for transmitting the converted messages.

2. Description of the Prior Art

In computer-to-computer communications, encryption techniques are widely used to protect privacy of information against third parties aside from the transmitter and the receiver of the information. Digital signature techniques which add signature information to transmission information are equally widely used to guarantee secure information transmission from the transmitter to the receiver.

For example, in the WWW (World Wide Web) system on the Internet, encryption techniques can be used when a user of a client apparatus inputs a message of a predetermined format in response to information provided from a server apparatus and transmits the input message to the server apparatus. The SSL (Secure Socket Layer) protocol and the S-HTTP (Secure-HyperText Transfer Protocol) are representative of such encryption techniques used in the WWW system.

To communicate a message which requires privacy using the SSL protocol, first a server (receiver of the message) sends a request to select whether to use the SSL protocol to a client (transmitter of the message), and the client accordingly selects to use the protocol (that is, to encrypt the message) and sends a list of available encryption methods to the server. After the server selects one of the available encryption methods, the message communication begins between the server and the client using the selected encryption method.

Thus, in message communication using the SSL protocol, to perform encrypted message communication depends on the client's decision to encrypt the message. Similarly, when using other conventional encryption techniques, encrypted communication is performed depending on whether the client chooses to perform encryption. This dependency on the client to decide whether to perform encryption often places a constraint on the performance of the server.

SUMMARY OF THE INVENTION

The present invention aims to provide a message receiving apparatus that determines whether to perform encryption/digital signature on each input message in a message transmitting apparatus according to conditions under which the message is transmitted from the message transmitting apparatus, and the message transmitting apparatus that transmits messages to the message receiving apparatus.

In order to fulfill the above object, the message receiving apparatus of the present invention is a message receiving apparatus for receiving messages from a message transmitting apparatus, the message receiving apparatus including: a first generating unit for generating first data for producing a display which urges a user of the message transmitting apparatus to input a message; a second generating unit for generating second data within the first data for specifying a conversion type for secret communication of the message; a transmitting unit for transmitting the first data including the second data to the message transmitting apparatus; and a receiving unit for receiving the message from the message transmitting apparatus after the first data including the second data has been transmitted to the message transmitting apparatus.

With this construction, the message receiving apparatus generates the first data for producing the display that urges the user of the message transmitting apparatus to input the message, generates the second data within the first data for specifying the conversion type for secret communication of the message, transmits the first data including the second data to the message transmitting apparatus, and subsequently receives the message from the message transmitting apparatus.

Thus, the message receiving apparatus can, according to its intentions such as improvement of the security in communication, freely specify the conversion type for secret communication of the message to be sent from the message transmitting apparatus. Also, the message receiving apparatus can specify a conversion type for each of a plurality of messages to be sent from the message transmitting apparatus.

The above object can also be fulfilled by a message receiving apparatus for receiving messages from a message transmitting apparatus, the message receiving apparatus including: a first receiving unit for receiving first data concerning a use condition of the message transmitting apparatus from the message transmitting apparatus; a first generating unit for generating second data for producing a display which urges a user of the message transmitting apparatus to input a message; a second generating unit for generating third data for specifying a conversion type for secret communication of the message according to the received first data; a transmitting unit for transmitting the second data and the third data to the message transmitting apparatus; and a second receiving unit for receiving the message from the message transmitting apparatus after the second data and the third data have been transmitted to the message transmitting apparatus.

With this construction, the message receiving apparatus receives the first data concerning the use of the message transmitting apparatus from the message transmitting apparatus, generates the second data for producing the display which urges the user of the message transmitting apparatus to input the message, generates the third data for specifying the conversion type for secret communication of the message according to the first data, and transmits the second data and the third data to the message transmitting apparatus. The message receiving apparatus subsequently receives the message from the message transmitting apparatus.

Accordingly, the message receiving apparatus with intentions such as improvement of the security in communication can by itself specify the conversion type for secret communication of the message according to the use condition of the message transmitting apparatus.

Here, the message receiving apparatus may further include an associating unit for associating the first data with conversion type information that indicates whether to perform encryption, which encryption method should be used if performing the encryption, whether to perform digital signature, and which digital signature method should be used if performing the digital signature, wherein the use condition of the message transmitting apparatus shown by the first data corresponds to an attribute of the user of the message transmitting apparatus, and wherein the second generating unit generates the third data according to the conversion type information associated with the first data.

With this construction, the message receiving apparatus, on receiving the first data concerning the user attribute of the message transmitting apparatus, generates the third data according to the conversion type information associated with the first data, the conversion type information indicating whether to encrypt/digitally sign the message and which encryption/digital signature method should be used. The message receiving apparatus then sends the second data and the third data to the message transmitting apparatus and subsequently receives the message converted by the message transmitting apparatus according to the third data.

Accordingly, the message receiving apparatus can specify whether to encrypt/digitally sign the message and which encryption/digital signature method should be used, based on the user attribute of the message transmitting apparatus.

Here, the second data may be written in an HTML format, wherein the third data is written within the second data using tags that extend the HTML format.

With this construction, the message receiving apparatus, on receiving the first data, generates the second data written in the HTML format and further generates the third data within the second data using the tags according to the first data.

Accordingly, the message receiving apparatus can specify whether to perform encryption/digital signature and which encryption/digital signature method should be used for the message by adding the special tags to the document written in HTML, based on the user attribute of the message transmitting apparatus. Thus, a conversion type can easily be specified for each of a plurality of messages by adding such special tags to an HTML document.

Here, the message receiving apparatus may further include a storing unit for storing fourth data showing key information necessary for the message transmitting apparatus to perform the encryption, wherein the transmitting unit transmits the second data, the third data, and the fourth data to the message transmitting apparatus.

With this construction, the message receiving apparatus transmits the fourth data showing the key information necessary for the encryption to the message transmitting apparatus along with the second data and the third data. Accordingly, the message receiving apparatus can easily specify the encryption method which uses the key information.

Here, the message receiving apparatus may further include a reconverting unit for reconverting the message received by the second receiving unit.

With this construction, the message receiving apparatus, after sending the second data and the third data to the message transmitting apparatus, receives the message which has been converted by the message transmitting apparatus according to the conversion type specified by the third data and reconverts the received message. Accordingly, the message receiving apparatus can perform secret communication of the message with the message transmitting apparatus with greater convenience by reconverting the received message.

Here, the conversion type specified in the third data may indicate whether to perform encryption, which of encryption methods set in advance in the message transmitting apparatus should be used if performing the encryption, whether to perform digital signature, and which of digital signature methods set in advance in the message transmitting apparatus should be used if performing the digital signature.

With this construction, the message receiving apparatus generates the third data according to the first data received from the message transmitting apparatus, the third data including an indication concerning whether to perform encryption/digital signature and which of encryption/digital signature methods set in advance in the message transmitting apparatus should be used.

Accordingly, the message receiving apparatus can specify whether to encrypt/digitally sign the message and which of encryption/digital signature methods set in the message transmitting apparatus should be used, based on the use condition of the message transmitting apparatus.

Also, to fulfill the above object, the message transmitting apparatus of the present invention is a message transmitting apparatus for transmitting messages to a message receiving apparatus, the message transmitting apparatus including: a receiving unit for receiving first data for producing a display which urges a user of the message transmitting apparatus to input a message from the message receiving apparatus, the first data including second data for specifying a conversion type for secret communication of the message; a displaying unit for producing the display according to the first data; an inputting unit for receiving the message inputted by the user in response to the display; a converting unit for converting the input message according to the second data; and a transmitting unit for transmitting the converted message to the message receiving apparatus.

With this construction, the message transmitting apparatus receives, from the message receiving apparatus, the first data for producing the display which urges the user to input the message and the accompanying second data for specifying the conversion type for secret communication of the message. The message transmitting apparatus then produces the display according to the first data, receives the message inputted by the user in response to the display, and converts the input message according to the second data. This converted message is then transmitted to the message receiving apparatus.

Accordingly, the message transmitting apparatus can convert the message according to the conversion type which has been specified by the message receiving apparatus with intentions such as improvement in the security in communication.

The above object can also be fulfilled by a message transmitting apparatus that outputs first data for producing a display to a displaying unit and transmits a message, inputted by a user via an inputting unit in response to the display, to a message receiving apparatus, the message transmitting apparatus including: a receiving unit for receiving the first data for producing the display which urges the user to input the message from the message receiving apparatus, the first data including second data for specifying a conversion type for secret communication of the message; a converting unit for converting the message inputted by the user according to the second data; and a transmitting unit for transmitting the converted message to the message receiving apparatus.

With this construction, the message transmitting apparatus receives, from the message receiving apparatus, the first data for producing the display which urges the user to input the message and the accompanying second data for specifying the conversion type for secret communication of the message. The message transmitting apparatus then outputs the first data to the displaying unit, converts the message inputted via the inputting unit in response to the display according to the second data, and transmits the converted message to the message receiving apparatus.

Accordingly, the message transmitting apparatus can convert the message according to the conversion type, that has been specified by the message receiving apparatus with intentions such as improvement of the security in communication, through the use of the existing displaying and inputting units.

The above object can also be fulfilled by a message transmitting apparatus for transmitting messages to a message receiving apparatus, the message transmitting apparatus including: an acquiring unit for acquiring first data concerning a use condition of the message transmitting apparatus; a first transmitting unit for transmitting the first data to the message receiving apparatus; a receiving unit for receiving, from the message receiving apparatus, second data for producing a display which urges a user to input a message and third data, generated according to the first data, for specifying a conversion type for secret communication of the message; a displaying unit for producing the display according to the second data; an inputting unit for receiving the message inputted by the user in response to the display; a converting unit for converting the input message according to the third data; and a second transmitting unit for transmitting the converted message to the message receiving apparatus.

With this construction, the message transmitting apparatus acquires the first data concerning the use of the message transmitting apparatus and transmits the first data to the message receiving apparatus. The message transmitting apparatus then receives the second data for producing the display which urges the user to input the message and the third data, generated according to the first data, for specifying the conversion type for secret communication of the message from the message receiving apparatus, and produces the display according to the second data. On receiving the message inputted by the user in response to the display, the message transmitting apparatus converts the input message according to the third data and transmits the converted message to the message receiving apparatus.

Accordingly, the message transmitting apparatus can convert the message according to the conversion type specified by the message receiving apparatus with intentions such as improvement of the security in communication. Also, since the conversion type has been determined by the message receiving apparatus based on the use condition of the message transmitting apparatus, the message can be converted in accordance with the conversion type appropriately specified by the message receiving apparatus.

Here, the message transmitting apparatus may further include an associating unit for associating the third data with conversion type information that indicates whether to perform encryption, which encryption method should be used if performing the encryption, whether to perform digital signature, and which digital signature method should be used if performing the digital signature, wherein the converting unit converts the input message according to the conversion type information associated with the third data.

With this construction, the message transmitting apparatus converts the input message according to the conversion type information indicating whether to perform encryption/ digital signature and which encryption/digital signature method should be used.

Accordingly, the message transmitting apparatus can encrypt and/or digitally sign the message according to an indication, made appropriately by the message receiving apparatus according to the use condition of the message transmitting apparatus, concerning whether to perform encryption/digital signature and which encryption/digital signature method should be used.

Here, the second data may be written in an HTML format, wherein the third data is written within the second data using tags that extend the HTML format.

With this construction, the third data received together with the second data is written within the second data of the HTML format using the tags that extend the HTML format. Accordingly, the message transmitting apparatus can encrypt and/or digitally sign the message according to an indication which can be made easily by the message receiving apparatus by adding the special tags to the HTML document and transmitting the document to the a message transmit ting apparatus.

Here, the message transmitting apparatus may further include a preventing unit for preventing the third data written using the tags from being displayed.

With this construction, the third data written within the second data using the tags is not displayed on the screen of the message transmitting apparatus. Since the third data specifying the conversion type is not displayed on the screen, it is possible to prevent the specified conversion type from being changed in the message transmitting apparatus.

Here, the receiving unit may receive fourth data showing key information necessary for performing the encryption from the message receiving apparatus together with the second data and the third data, wherein the converting unit converts the input message according to the third data and the fourth data.

With this construction, the message transmitting apparatus converts the message using the key information shown by the fourth data according to the conversion type information associated with the third data. Accordingly, the message transmitting apparatus can easily encrypt the input message using the received key information necessary for the specified encryption method.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 6 shows an example of the correspondence between encryption variables and encryption/digital signature methods;

FIG. 11 shows a message input form creation document included in document 0001 corresponding to attribute information 1 (members);

FIG. 12 shows a message input form creation document included in document 0002 corresponding to attribute information 2 (visitors);

FIG. 15 shows a specific example of internal data generated from data inputted on the reservation setting display 402; and FIG. 16 shows a specific example of data generated by performing encryption and digital signature on the internal data in FIG. 15.

DESCRIPTION OF THE PREFERRED EMBODIMENTS

The following is a description of a data communication system of the embodiment of the present invention with reference to the figures.

Figure 1:
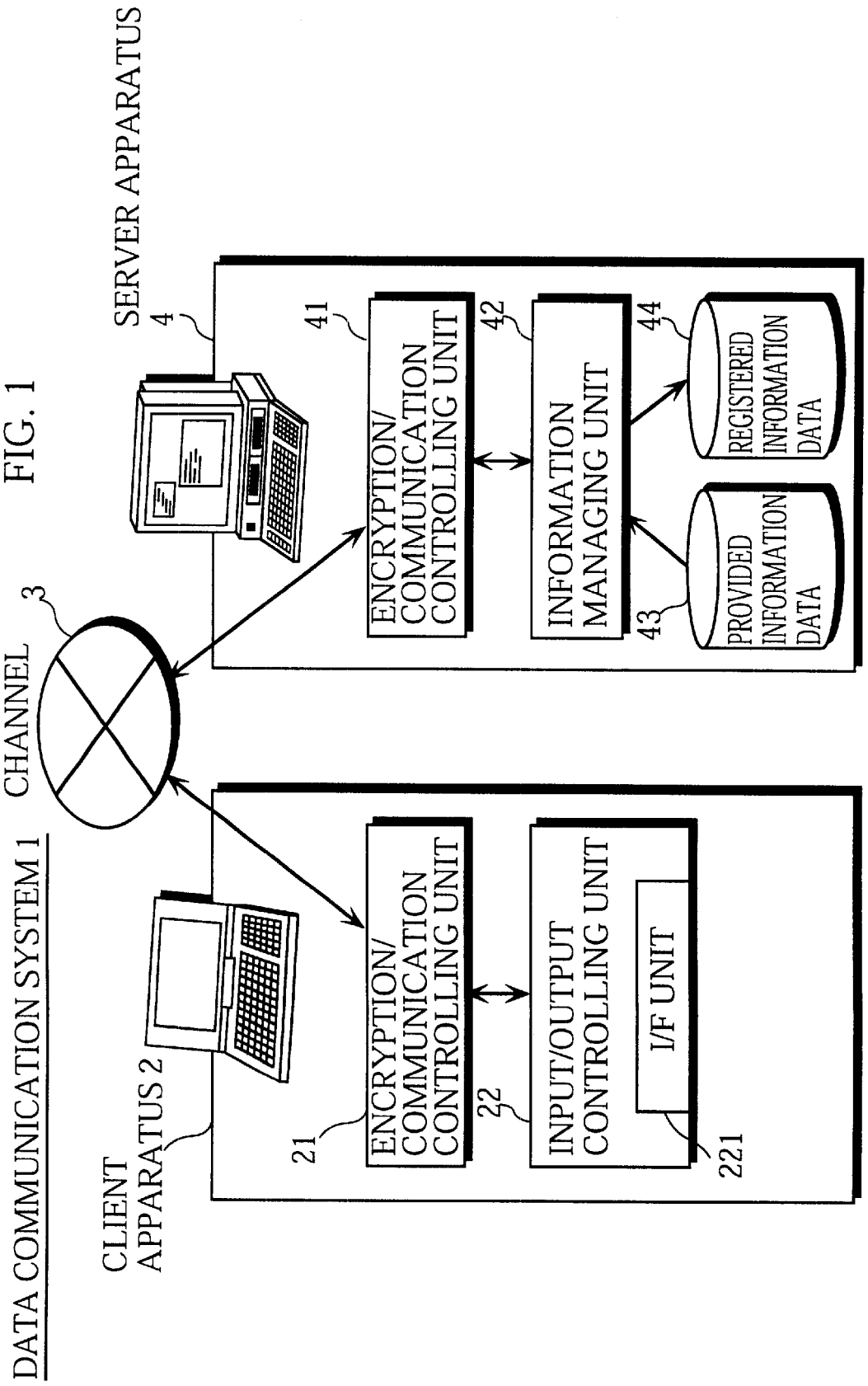
FIG. 1 is a block diagram showing the general construction of a data communication system 1 of the embodiment of the present invention.

FIG. 1 is a block diagram showing the general construction of a data communication system 1 of the embodiment of the present invention.

The data communication system 1 mainly includes a client apparatus 2 whose user utilizes information provided by a server apparatus 4, the server apparatus 4 which provides information for the user of the client apparatus 2, and a radio or cable channel 3, and can be used as a WWW system linked to the Internet.

This specification describes the data communication system 1 based on the following assumption. That is, the user of the client apparatus 2 first sends an information request to the server apparatus 4, the server apparatus 4 accordingly provides the requested information to the client apparatus 2, and the user of the client apparatus 2 inputs a message which requires privacy in response to the received information and transmits the message to the server apparatus 4.

The server apparatus 4 is primarily used for providing information on the Internet and, as shown in FIG. 1, includes provided information data 43 to be provided for the user of the client apparatus 2 (information user), registered information data 44 obtained from the information user, an information managing unit 42 for managing retrieval and registration of information, and an encryption/communication controlling unit 41 for controlling transmission/reception of data with the client apparatus 2, message encryption and other processes.

The client apparatus 2 is primarily used for utilizing information on the Internet and, as shown in FIG. 1, includes an encryption/communication controlling unit 21 for controlling transmission/reception of data with the server apparatus 4 as well as message encryption and other processes, and an input/output controlling unit 22 equipped with an I/F unit 221 as a user interface.

The inner constructions of the client apparatus 2 and server apparatus 4 are explained in greater detail below with reference to FIGS. 2–4. In these figures, "plaintext" is a generic term for data (including messages), held in the client apparatus 2 or the server apparatus 4, which is neither encrypted nor digitally signed, while "communication text" is a generic term for data, whether or not encrypted/digitally signed, which is being transmitted or received between the encryption/communication controlling unit 21 of the client apparatus 2 and the encryption/communication controlling unit 41 of the server apparatus 4.

Figure 2:
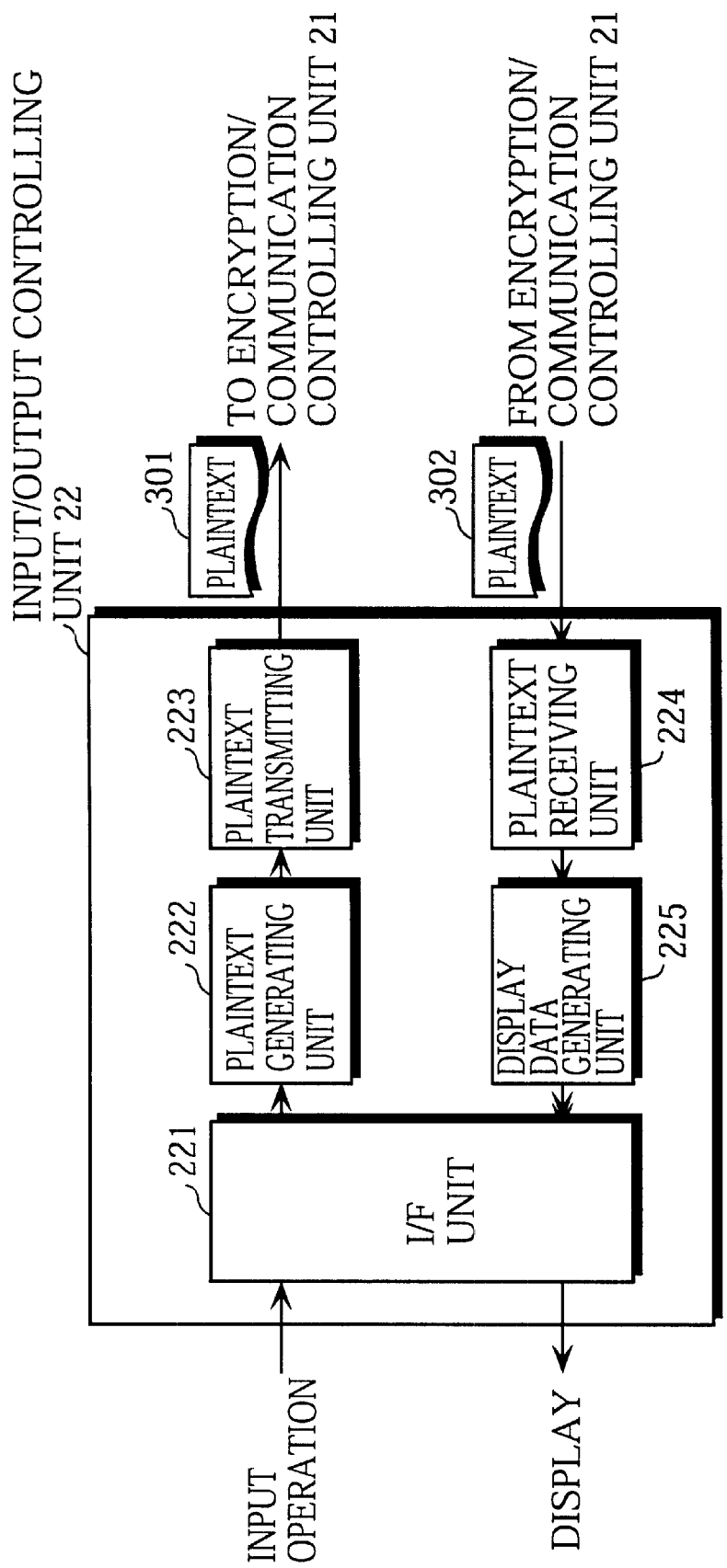
FIG. 2 is a block diagram showing the construction of an input/output controlling unit 22 in a client apparatus 2.

FIG. 2 is a block diagram showing the construction of the input/output controlling unit 22 in the client apparatus 2.

This input/output controlling unit 22 includes the I/F unit 221 equipped with a keyboard, a screen and the like, a plaintext generating unit 222, a plaintext transmitting unit 223, a plaintext receiving unit 224, and a display data generating unit 225.

When transmitting data to the server apparatus 4, the I/F unit 221 receives data inputted by the information user, the plaintext generating unit 222 processes the input data to generate a plaintext 301, and the plaintext transmitting unit 223 transmits the generated plaintext 301 to the encryption/communication controlling unit 21.

When receiving data from the server apparatus 4, the plaintext receiving unit 224 receives a plaintext 302 from the encryption/communication controlling unit 21, the display data generating unit 225 generates display data from the received plaintext 302, and the I/F unit 221 displays information on the screen for the user based on the generated display data.

Figure 3:
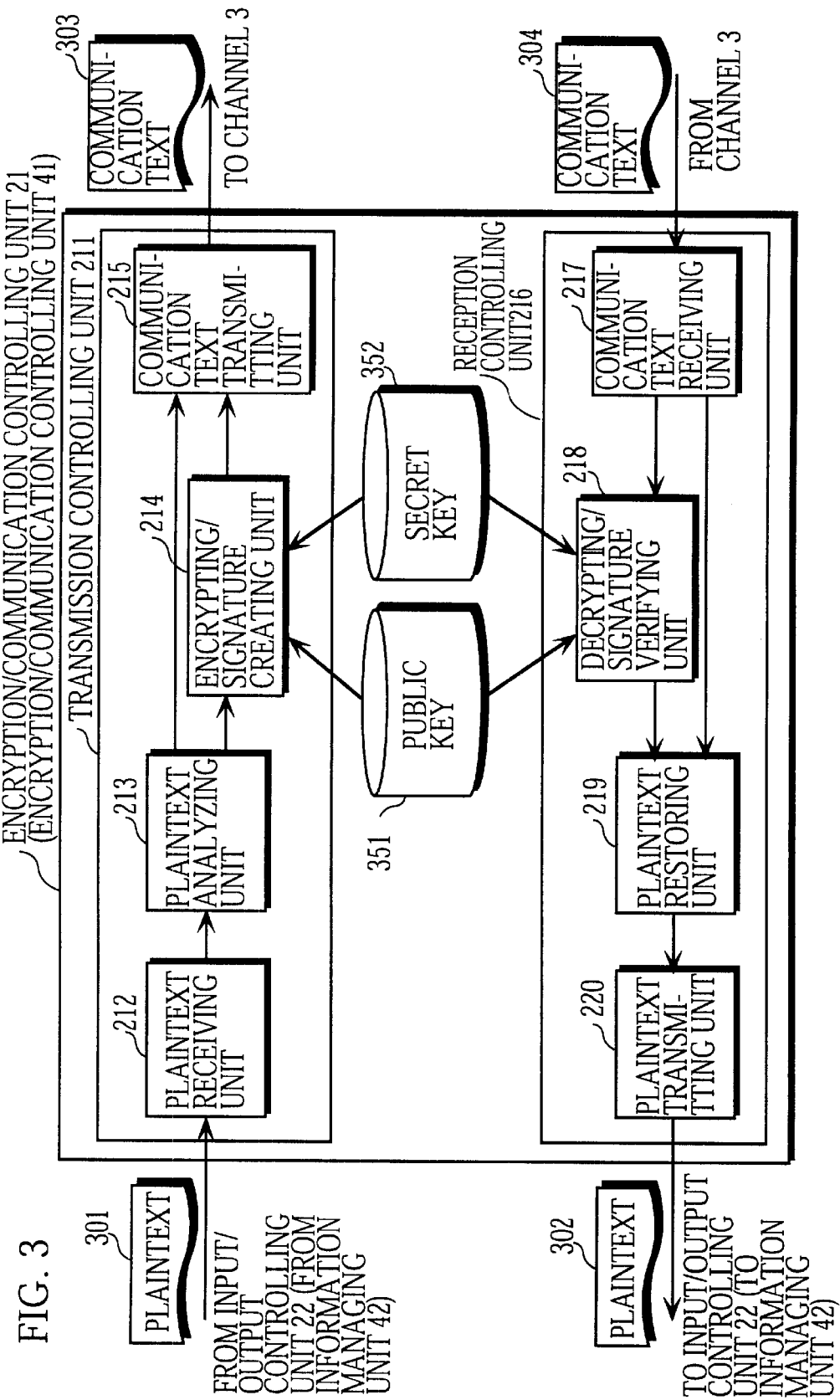
FIG. 3 is a block diagram showing the construction of an encryption/communication controlling unit 21 in the client apparatus 2 (and an encryption/communication controlling unit 41 in a server apparatus 4)

FIG. 3 is a block diagram showing the construction of the encryption/communication controlling unit 21 of the client apparatus 2 (the construction shown in the figure is also applicable to the encryption/communication controlling unit 41 of the server apparatus 4).

This encryption/communication controlling unit 21 includes a transmission controlling unit 211 for transmitting a communication text 303 generated from the plaintext 301 to the server apparatus 4 and a reception controlling unit 216 for generating the plaintext 302 from a communication text 304 received from the server apparatus 4. In this construction, a public key 351 and a secret key 352 are shared by the transmission controlling unit 211 and the reception controlling unit 216 for performing processing for encryption/digital signature.

More specifically, the transmission controlling unit 211 includes a plaintext receiving unit 212, a plaintext analyzing unit 213, an encrypting/signature creating unit 214 and a communication text transmitting unit 215, while the reception controlling unit 216 includes a communication text receiving unit 217, a decrypting/signature verifying unit 218, a plaintext a restoring unit 219 and a plaintext transmitting unit 220.

When transmitting data to the server apparatus 4, the plaintext receiving unit 212 sends the plaintext 301 received from the input/output controlling unit 22 to the plaintext analyzing unit 213 which judges whether to encrypt/digitally sign the plaintext 301.

On judging that encryption or digital signature needs to be performed on the plaintext 301, the plaintext analyzing unit 213 sends the plaintext 301 to the encrypting/signature creating unit 214. The encrypting/signature creating unit 214 accordingly encrypts or digitally signs the received plaintext 301 using the public key 351 or the secret key 352 and sends the result to the communication text transmitting unit 215. When, on the other hand, it is judged that neither encryption nor digital signature is necessary, the plaintext analyzing unit 213 sends the plaintext 301 directly to the communication text transmitting unit 215.

The communication text transmitting unit 215 generates the communication text 303 from the data received from the plaintext analyzing unit 213 or the encrypting/signature creating unit 214 and transmits the communication text 303 to the server apparatus 4 via the channel 3.

When receiving data from the server apparatus 4, the communication text receiving unit 217 receives the communication text 304 from the server apparatus 4 via the channel 3 and judges whether to perform decryption/digital signature verification.

When judging that decryption or digital signature verification needs to be performed, the communication text receiving unit 217 sends the communication text 304 to the decrypting/signature verifying unit 218. The decrypting/signature verifying unit 218 accordingly decrypts the communication text 304 or verifies a digital signature of the communication text 304 using the public key 351 or the secret key 352, and sends the result to the plaintext restoring unit 219. When, on the other hand, judging that neither decryption nor digital signature verification is necessary, the communication text receiving unit 217 sends the communication text 304 directly to the plaintext restoring unit 219.

The plaintext restoring unit 219 restores the plaintext 302 from the data received from the communication text receiving unit 217 or the decrypting/signature verifying unit 218, and the plaintext transmitting unit 220 sends the restored plaintext 302 to the input/output controlling unit 22.

The construction and operation of each component in the encryption/communication controlling unit 41 of the server apparatus 4 are the same as the encryption/communication controlling unit 21 shown in FIG. 3. However, note that the encryption/communication controlling unit 41 of the server apparatus 4 sends/receives plaintexts to/from the information managing unit 42, and sends/receives communication texts to/from the client apparatus 2 via the channel 3. In this encryption/communication controlling unit 41 of the server apparatus 4, a plaintext sent from the information managing unit 42 is encrypted or digitally signed as necessary, and then a communication text is generated and sent to the client apparatus 2. A communication text sent from the client apparatus 2 is decrypted or its digital signature is verified as necessary, and then a plaintext is generated and sent to the information managing unit 42.

Figure 4:
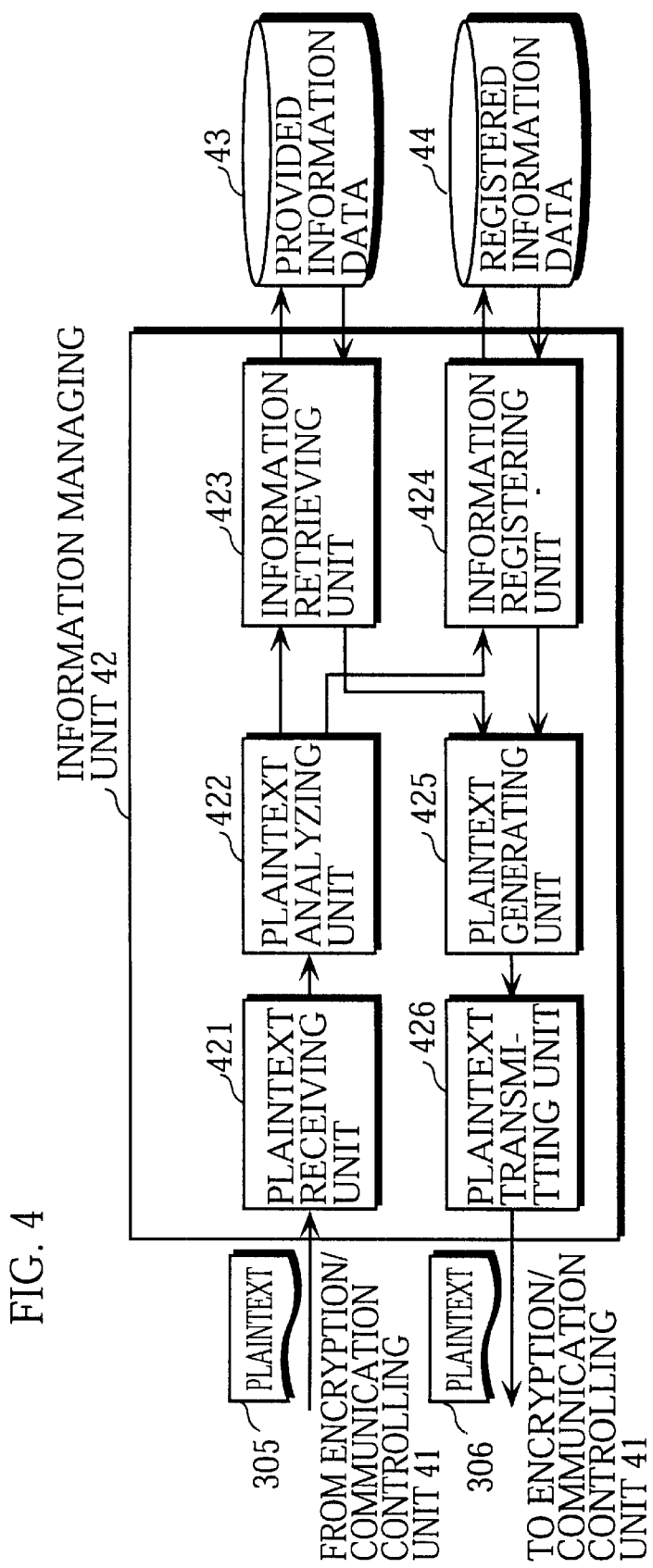
FIG. 4 is a block diagram showing the construction of an information managing unit 42 in the server apparatus 4.

FIG. 4 is a block diagram showing the construction of the information managing unit 42 of the server apparatus 4.

As shown in the figure, the information managing unit 42 includes a plaintext receiving unit 421, a plaintext analyzing unit 422, an information retrieving unit 423, an information registering unit 424, a plaintext generating unit 425 and a plaintext transmitting unit 426.

The plaintext receiving unit 421 receives a plaintext 305 from the encryption/communication controlling unit 41 and sends the plaintext 305 to the plaintext analyzing unit 422. The plaintext analyzing unit 422 analyzes the received plaintext 305 and sends it either to the information retrieving unit 423 or to the information registering unit 424, depending on the process required in the plaintext 305.

When the plaintext 305 analyzed by the plaintext analyzing unit 422 shows a request to provide information, the information retrieving unit 423 retrieves the information requested by the plaintext 305 from the provided information data 43. When the plaintext 305 analyzed by the plaintext analyzing unit 422 shows a request to register information, the information registering unit 424 registers the information in the registered information data 44.

The plaintext generating unit 425 generates a plaintext 306 which is either the retrieved information to be provided for the information user (user of the client apparatus 2) or a communication completion notification showing the registration completion, and the plaintext transmitting unit 426 sends the generated plaintext 306 to the encryption/communication controlling unit 41.

Figure 5:
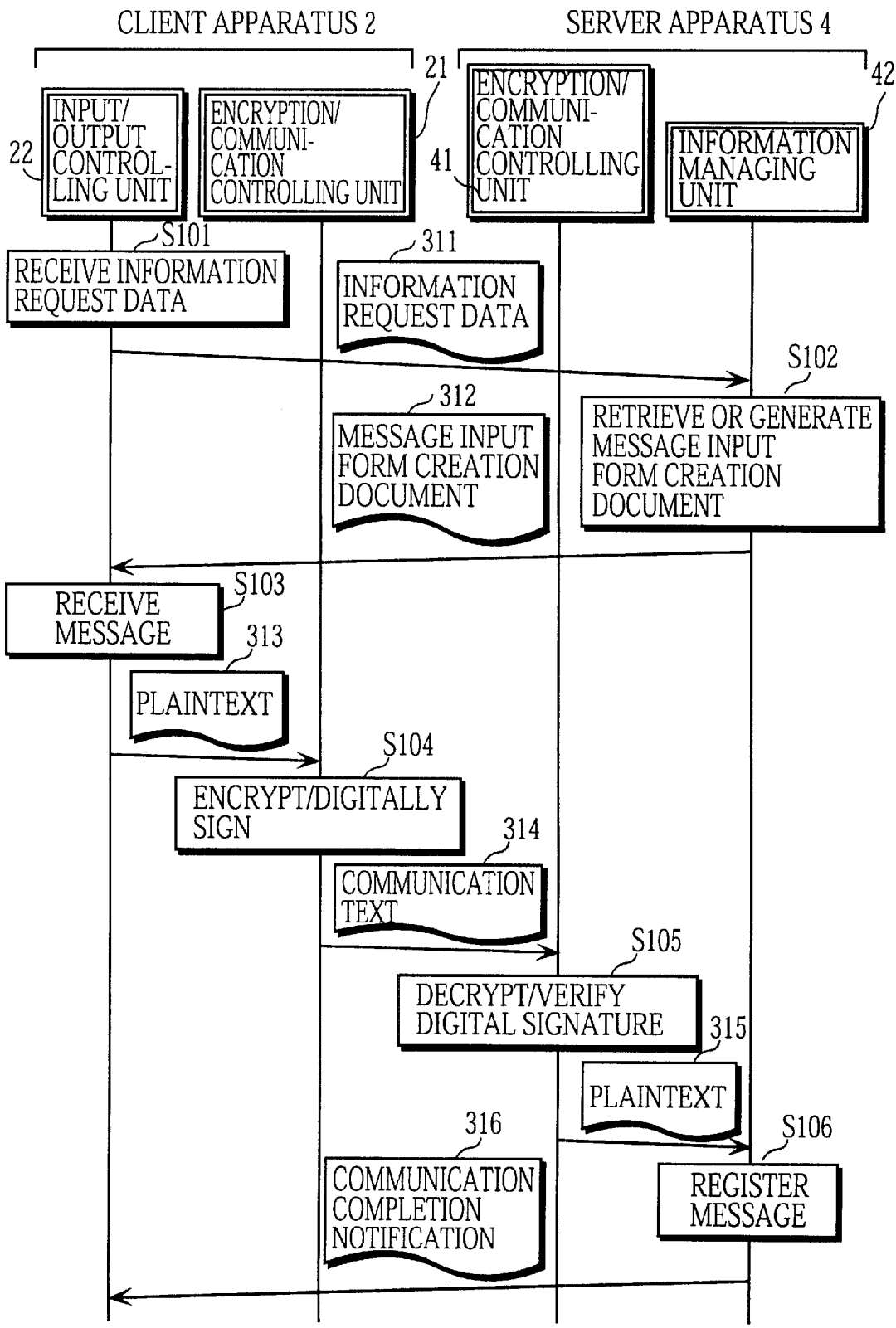
FIG. 5 is a sequence diagram showing a flow of data between the client apparatus 2 and the server apparatus 4 in the data communication system 1.

FIG. 5 is a sequence diagram showing a flow of data between the client apparatus 2 and the server apparatus 4 in the data communication system 1.

In the figure, processing in the input/output controlling unit 22 and encryption/communication controlling unit 21 of the client apparatus 2 and the encryption/communication controlling unit 41 and information managing unit 42 of the server apparatus 4 is shown on the four vertical lines, while data in communication is shown between the lines with a horizontal arrow below indicating the origin and end points of the data. In the figure, the direction from top to bottom corresponds to the flow of time.

In the figure, "message input form" is data displayed on the screen of the I/F unit 221 for the information user (user of the client apparatus 2) to input a message as a reply to the information provider (user of the server apparatus 4), while "message input form creation document" is a document, such as an HTML (HyperText Markup Language) document, used for displaying the message input form on the screen of the I/F unit 221. (Specific examples of message input forms and message input form creation documents will be explained later with reference to FIGS. 11–14. For details on HTML, see Laura Lemay (1995) *Teach Yourself Web Publishing with HTML in a Week*, Sams Publishing.)

In the data communication system 1 of the present embodiment, data (message) requested by the server apparatus 4 is transmitted from the client apparatus 2 to the server apparatus 4 in four main steps given below.

First Step

The input/output controlling unit 22 in the client apparatus 2 receives information request data 311 from the information user for requesting the information provider to provide information (S101), this information request data 311 being transmitted to the server apparatus 4 via the encryption/communication controlling unit 21. Here, the information request data 311 includes attribute information on the use of the client apparatus 2, such as user attribute information and apparatus attribute information.

Second Step

In the server apparatus 4, the encryption/communication controlling unit 41 receives the information request data 311 from the client apparatus 2, and the information managing unit 42 retrieves a message input form creation document 312 corresponding to the information request data 311 and the attached attribute information and transmits the message input form creation document 312 through the encryption/communication controlling unit 41 to the client apparatus 2. When the message input form creation document 312 corresponding to the information request data 311 is not included in the provided information data 43 in the server apparatus 4, a message input form creation document 312 is newly generated in the server apparatus 4 using the attribute information and an encryption variable (described later) (S102).

Third Step

In the client apparatus 2, the input/output controlling unit 22 receives a message inputted by the information user on a message input form displayed according to the message input form creation document 312 sent from the server apparatus 2 via the encryption/communication controlling unit 21 (S103), and this input message is sent to the encryption/communication controlling unit 21 as a plaintext 313. The encryption/communication controlling unit 21 processes the plaintext 313 according to an indication in the message input form creation document 312 concerning whether to encrypt/digitally sign the plaintext 313 and which encryption/digital signature method should be used (S104). Then a communication text 314 generated from the processing result is transmitted to the server apparatus 4 by the encryption/communication controlling unit 21.

Fourth Step

In the server apparatus 4, the encryption/communication controlling unit 41 analyzes the received communication text 314. If the communication text 314 has been encrypted or digitally signed, the encryption/communication controlling unit 41 accordingly decrypts the communication text 314 or verifies a digital signature of the communication text 314 (S105). The information managing unit 42 registers a plaintext 315 which has been restored by the encryption/communication controlling unit 41 in the registered information data 44 as needed (S106), and transmits a communication completion notification 316 for notifying the information user of the procedure completion to the client apparatus 2 via the encryption/communication controlling unit 41.

In the above data communication, the server apparatus 4 can determine whether to perform encryption, which encryption method is to be used, whether to perform digital signature, and which digital signature method is to be used, according to the attribute information of the client apparatus 2.

In actual data communication between the client apparatus 2 and the server apparatus 4, extension tags which can be defined in advance for specifying an encryption variable are included in the message input form creation document 312 that is presented, for instance, in HTML. This encryption variable is used to specify a conversion type, that is, one of a plurality of encryption methods and/or one of a plurality of digital signature methods to be used by the client apparatus 2 for converting a message inputted in response to the displayed message input form.

FIG. 6 shows an example of the correspondence between values of the encryption variable and encryption/digital signature methods.

The encryption variable specifies one of various encryption methods and/or one of various digital signature methods for a message inputted by the information user. The correspondence such as shown in FIG. 6 has been set in the client apparatus 2 in advance, wherein the encryption variable "ONLY" specifies only the use of the RSA (Rivest-Shamir-Adleman) cryptosystem for encryption, the encryption variable "MIC-CLEAR" specifies only the use of the public key cryptosystem for digital signature creation, and the encryption variable "ENCRYPTED" specifies both the use of the MyEllty-DES-CBC (MyEllty-Data Encryption Standard-Cipher Block Chaining) mode for encryption and the MyEllty-SHA-1 (MyEllty-Secure Hash Algorithm-1) mode for digital signature creation. (Encryption methods, such as the RSA and public key cryptosystems, are explained in detail in Nobuichi Ikeno and Kenji Koyama (1986) *Modern Encryption Theory,* Institute of Electronic Information and Communication.) Note that one or more keys necessary for performing encryption using the encryption method specified by the encryption variable are sent from the server apparatus 4 to the client apparatus 2 together with the encryption variable.

The control procedures of the client apparatus 2 and server apparatus 4 when performing the data communication shown in FIG. 5 using the correspondence table in FIG. 6 are explained below with reference to FIGS. 7 and 8.

Figure 7:
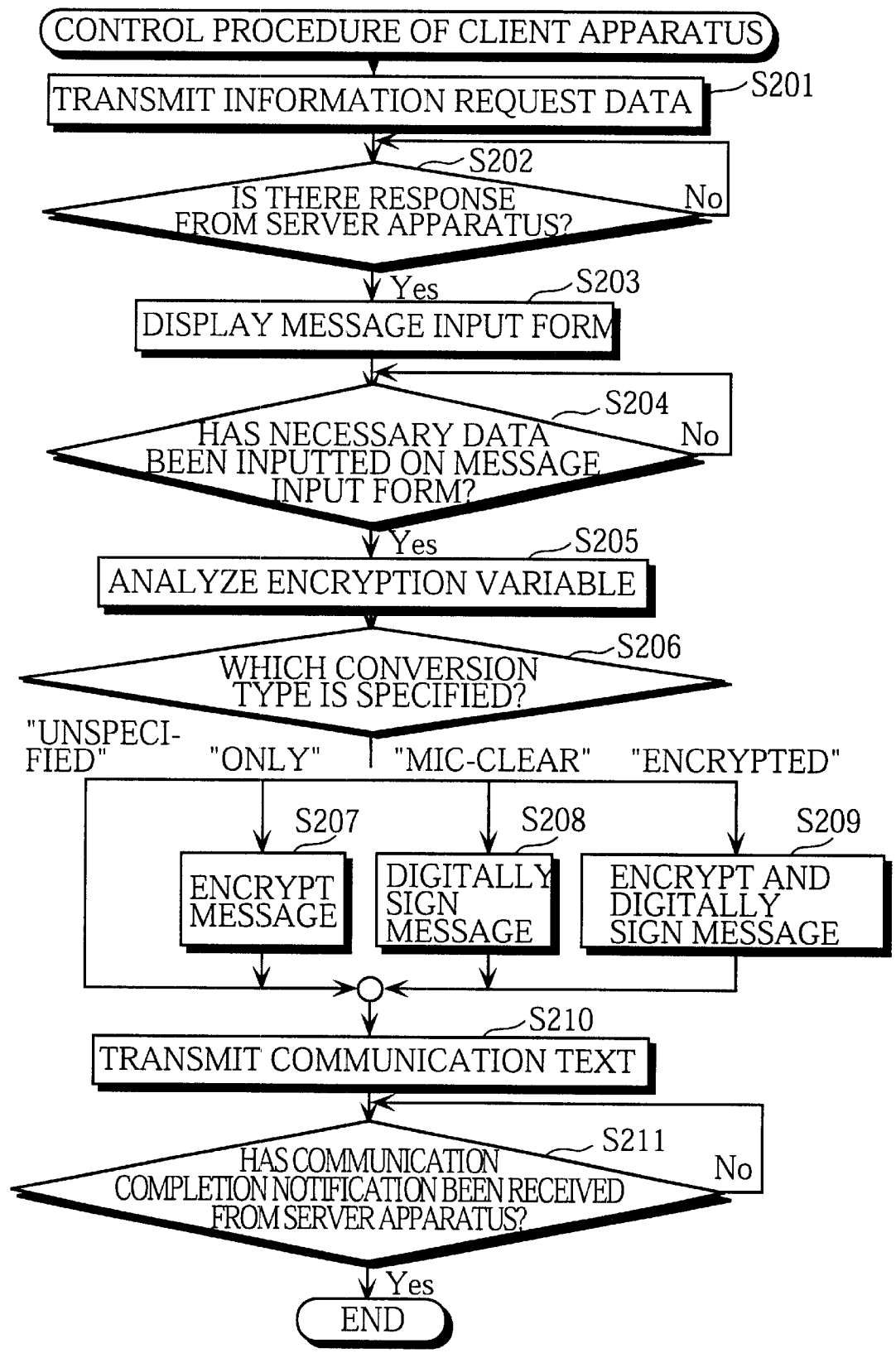
FIG. 7 is a flowchart showing the control procedure of the client apparatus 2.

FIG. 7 is a flowchart showing the control procedure of the client apparatus 2 in the data communication system 1.

The client apparatus 2 first transmits the information request data 311 in FIG. 5 including the user attribute information to the server 4 (S201) and waits for a response from the server apparatus 4 (S202).

On receiving the message input form creation document 312 as the response from the server apparatus 4, the client apparatus 2 displays the message input form (S203) and waits for a user input (S204).

When the user inputs a message (plaintext 313 in FIG. 5) on the message input form, the encryption variable in the message input form creation document 312 is analyzed (S205) to specify a conversion type (S206). When the encryption variable is "ONLY", the input message is encrypted using the specified encryption method (RSA in FIG. 6) (S207). When the encryption variable is "MIC-CLEAR", the input message is digitally signed using the specified digital signature method (public key cryptosystem) (S208). When the encryption variable is "ENCRYPTED", the input message is encrypted and digitally signed using the specified encryption method (MyEllty-DES-CBC) and digital signature method (MyEllty-SHA-1) (S209).

After encrypting and/or digitally signing the input message according to the conversion type specified by the encryption variable, the client apparatus 2 transmits the converted message to the server apparatus 4 as the communication text 314 (S210) and waits for the communication completion notification 316 as the reply to the communication text 314 (S211). If, on the other hand, the message input form creation document 312 does not include an encryption variable in step S205, the client apparatus 2 judges that neither encryption nor digital signature is necessary and transmits the input message directly to the server apparatus 4 as the communication text 314 in step S210. On receiving the communication completion notification 316 from the server apparatus 4, the client apparatus 2 completes the procedure.

Figure 8:
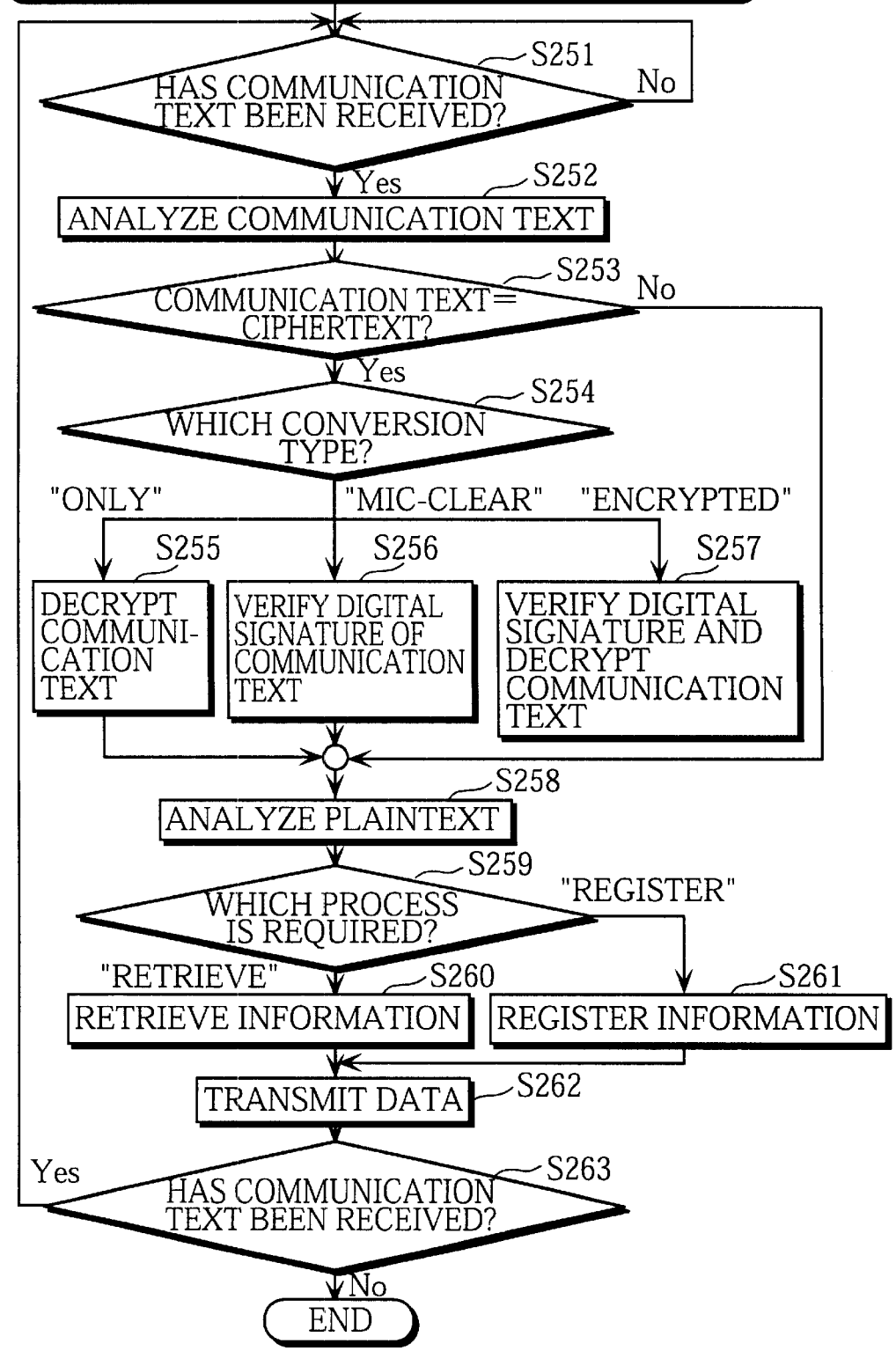
FIG. 8 is a flowchart showing the control procedure of the server apparatus 4.

FIG. 8 is a flowchart showing the control procedure of the server apparatus 4 in the data communication system 1.

The server apparatus 4 waits for a communication text (information request data 311 or communication text 314 in FIG. 5) from the client apparatus 2 (S251). On receiving a communication text, the server apparatus 4 analyzes the communication text (S252) to judge whether the text is a ciphertext (S253). If the communication text is a ciphertext (in the present example, if the communication text is the communication text 314 generated from the encrypted and/or digitally signed plaintext 313), the server apparatus 4 detects the conversion type from the encryption variable (S254). When the encryption variable is "ONLY" showing that the encryption method (RSA) specified by the encryption variable has been used for the communication text, the server apparatus 4 decrypts the communication text using the same encryption method (S255). When the encryption variable is "MIC-CLEAR" showing that the digital signature method (public key cryptosystem) specified by the encryption variable has been used for the communication text, the server apparatus 4 verifies a digital signature of the communication text using the same digital signature method (S256). When, on the other hand, the encryption variable is "ENCRYPTED" showing that the encryption and digital signature methods (MyEllty-DES-CBC and MyEllty-SHA-1) specified by the encryption variable have been used for the communication text, the server apparatus 4 verifies a digital signature of the communication text and decrypts the communication text using the same digital signature and encryption methods (S257). If the communication text is not a ciphertext (in the present example, if the communication text is the information request data 311) in step S253, the procedure proceeds to step S258.

The server apparatus 4 analyzes the restored plaintext (S258) to find out the process required by the client apparatus 2 for the communication text (S259) If the client apparatus 2 requests information retrieval (that is, if the communication text is the information request data 311), the server apparatus 4 retrieves information requested by the client apparatus 2 from the provided information data 43 (S260). If the client apparatus 2 requests information registration (that is, if the communication text is the communication text 314), the server apparatus 4 registers information included in the communication text into the registered information data 44 (S261).

If the communication text is the information request data 311, after step S260 the server apparatus 4 transmits the message to input form creation document 312 (e.g. facility reservation system) to the client apparatus 2 (S262) and waits for the next communication text (S263). If, on the other hand, the communication text is the communication text 314 (e.g. reservation apply form), after step S261 the server apparatus 4 transmits the communication completion notification 316 (e.g. reservation result) to the client apparatus 2 (S262) and waits for the next communication text (S263). When no more communication texts are sent from the client apparatus 2, the server apparatus 4 completes the procedure.

The following is a specific explanation of displays on the screen of the client apparatus 2 and related display data with reference to FIGS. 9–16.

In an example given below, the data communication system 1 is used as a facility (such as a golf course) reservation management system, wherein the server apparatus 4 manages facility reservations and the user of the client apparatus 2 makes a reservation for the use of the facility online on the Internet. Here, users of the facility include members of a particular club for utilizing the facility and visitors who are not the club members.

Figures 9, 10:
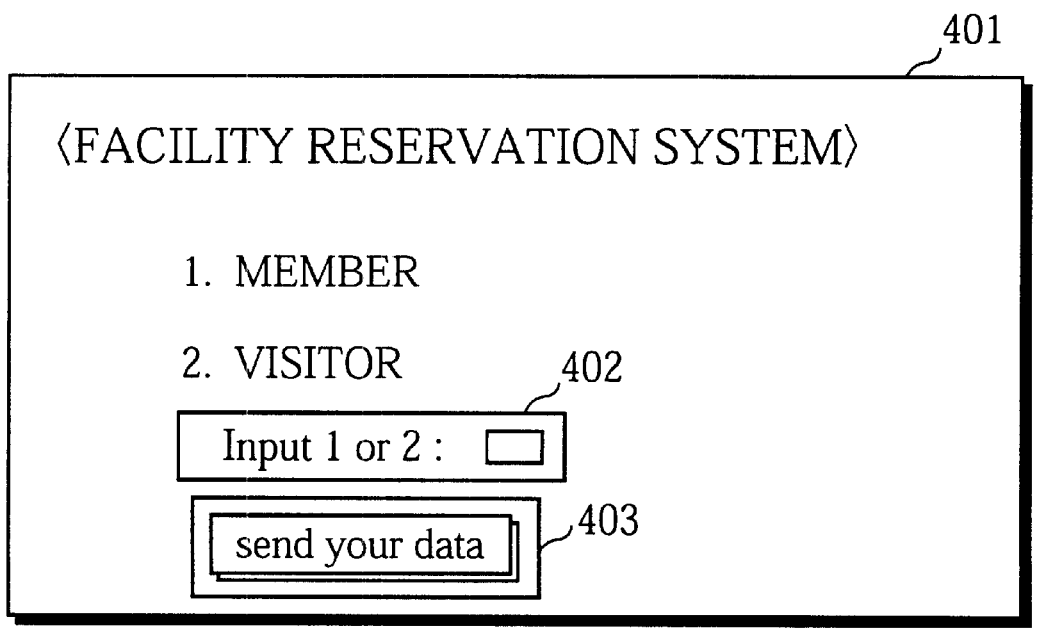
FIG. 9 shows a facility reservation system menu display 401 that is displayed on a screen of an I/F unit 221 in the client apparatus 2 based on a predetermined HTML document retrieved from provided information data 43 in the server apparatus 4.
FIG. 10 shows a correspondence table, held in the server apparatus 4, between user attribute information sent from the client apparatus 2 and documents to be sent to the client apparatus 2.

FIG. 9 shows a facility reservation system menu display 401 displayed on the screen of the I/F unit 221 in the client apparatus 2 based on a predetermined HTML document retrieved from the provided information data 43 in the server apparatus 4. While displays and encryption/digital signature processes in the client apparatus 2 are indicated by HTML documents in the present example, other types of documents may instead be used.

The user of the client apparatus 2 inputs "1" or "2" on a display item 402 in the menu display 401 in FIG. 9 depending on his/her status as a member or a visitor, and has the client apparatus 2 transmit the input data "1" or "2" which is user attribute information to the server apparatus 4 by selecting a display item 403.

In the server apparatus 4, HTML documents corresponding to user attribute information 1 and 2 have been set in advance. FIG. 10 shows the correspondence table, held in the server apparatus 4, between user attribute information received from the client apparatus 2 and documents to be sent to the client apparatus 2. FIG. 11 shows a message input form creation document included in document 0001 corresponding to user attribute information 1 (members). FIG. 12 shows a message input form creation document included in document 0002 corresponding to user attribute information 2 (visitors).

When receiving user attribute information 1 from the client apparatus 2, the server apparatus 4 retrieves document 0001 including the message input form creation document shown in FIG. 11 from the provided information data 43 and sends it to the client apparatus 2. This message input form creation document includes extension INPUT tags 501 and 502. In extension INPUT tag 501, "Proc-Type" and "ENCRYPTED" (encryption variable) are specified respectively as a name attribute and a value attribute corresponding to the name attribute "Proc-Type", while in extension INPUT tag 502, "Key" and "C0Qb28sgCW49TcbhA4BE" (key data used for encryption/digital signature) are specified respectively as a name attribute and a value attribute corresponding to the name attribute "Key".

The client apparatus 2 processes extension INPUT tags 501 and 502 and performs the specified encryption/digital signature on a message inputted by the user. Here, according to the encryption variable "ENCRYPTED", the input message is encrypted by the MyEllty-DES-CBC mode and digitally signed by the MyEllty-SHA-1 mode using the key data. The resulting message is then transmitted to the server apparatus 4. (Note that "hidden" in FIG. 11 is set as a type attribute for preventing the contents of INPUT tags 501 and 502 from being displayed in the client apparatus 2.)

When, on the other hand, receiving user attribute information 2 from the client apparatus 2, the server apparatus 4 retrieves document 0002 including the message input form creation document in FIG. 12 from the provided information data 43 and sends it to the client apparatus 2. Since a message inputted by a visitor will not be treated as data which requires privacy against third parties on the Internet in the present example, extension INPUT tags described above are not included in this message input form creation document. Accordingly, the client apparatus 2 transmits an input message to the server apparatus 4 without performing encryption/digital signature on the message.

Figure 13:
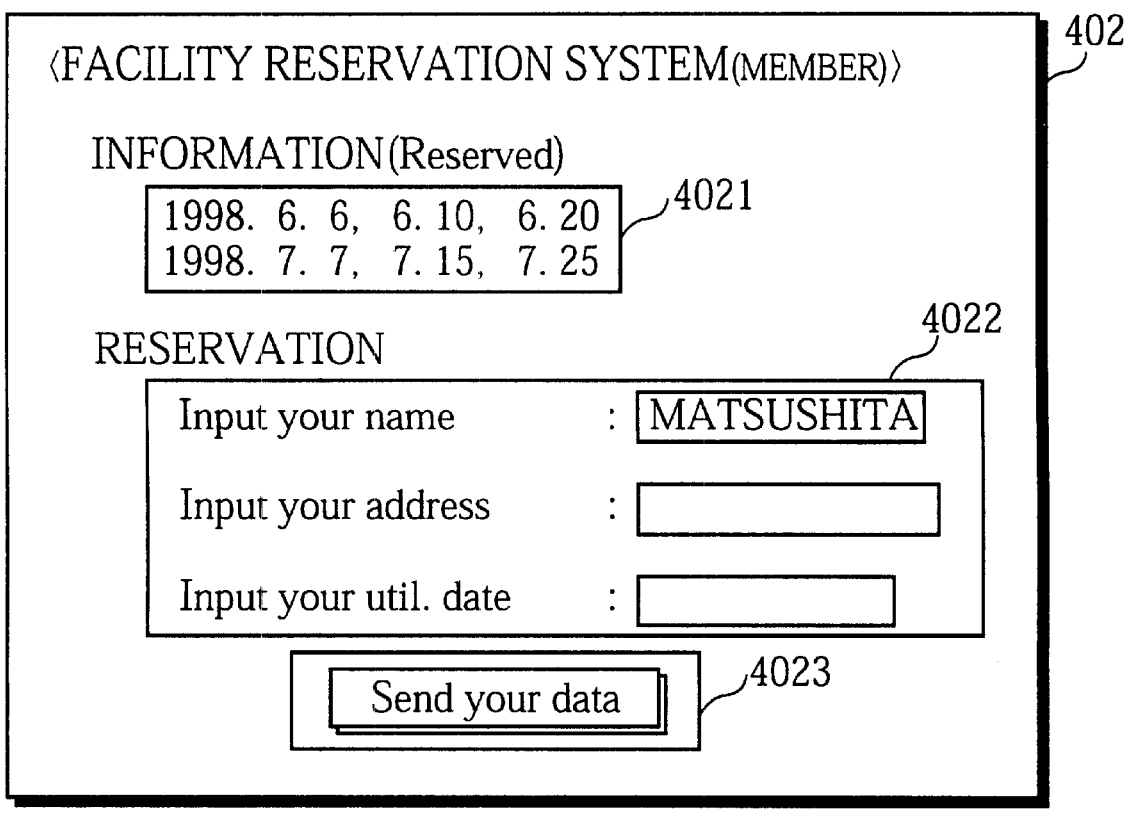
FIG. 13 shows an example of a reservation setting display 402 which includes a message input form for members.

The message input form creation document (for members) in FIG. 11 is accompanied with data showing reservation conditions, and as a result a reservation setting display 402 which includes a message input form for members is displayed on the screen of the I/F unit 211 in the client apparatus 2 as shown in FIG. 13. Similarly, the message input form creation document (for visitors) in FIG. 12 is accompanied with the data showing the reservation conditions, and as a result a reservation setting display 403 which includes a message input form for visitors is displayed on the screen of the I/F unit 211 in the client apparatus 2 as shown in FIG. 14.

Figure 14:
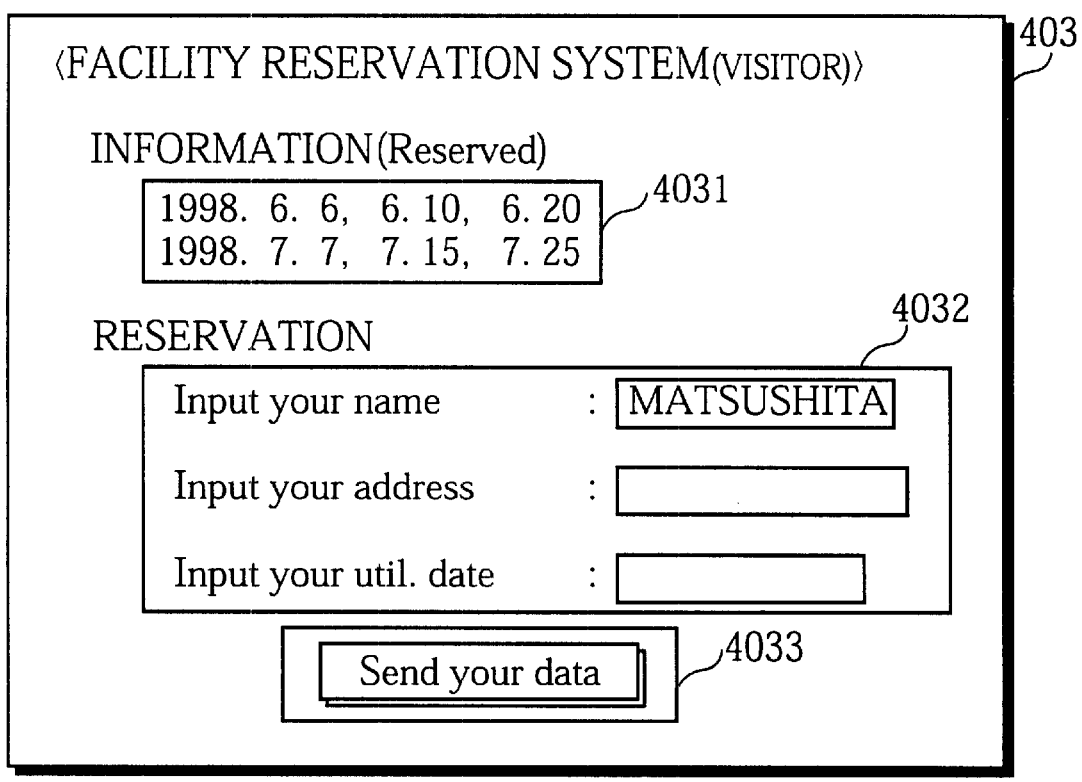
FIG. 14 shows an example of a reservation setting display 403 which includes a message input form for visitors.

The reservation setting display (for members) 402 in FIG. 13 and the reservation setting display (for visitors) 403 in FIG. 14 respectively include reservation condition display items 4021 and 4031 showing dates which have already been reserved, message input forms 4022 and 4032, and transmission indication display items 4023 and 4033, and differ only in their headings. However, messages inputted on the message input forms 4022 and 4032 will be processed differently.

The following is an explanation of specific examples of internal data, generated from a message inputted on the message input form 4022 in the reservation setting display (for members) 402 in FIG. 13 which is displayed according to the message input form creation document in FIG. 11, and data obtained by encrypting and digitally signing the internal data.

FIG. 15 shows a specific example of internal data generated from a message inputted on the reservation setting display 402, while FIG. 16 shows a specific example of data generated by encrypting and digitally signing the internal data shown in FIG. 15.

The internal data in FIG. 15 corresponds to the plaintext 313 in FIG. 5 and includes data 601 showing the encryption variable "ENCRYPTED" specified by the server apparatus 4, data 602 showing an input name "MATSUSHITA TARO", data 603 showing an input address "NAGOYA", data 604 showing an input date "1998. 7. 10" and data 605 showing the specified key "C0Qb28sgCW49TcbhA4BE".

By performing encryption and digital signature, the data in FIG. 16 is generated and transmitted to the server apparatus 4. The data in FIG. 16 includes data 651 showing key information (obtained by encrypting a common key used in the MyEllty-DES-CBC mode using a public key) to be used by the server apparatus 4 to perform decryption corresponding to the encryption by the MyEllty-DES-CBC mode, data 652 showing signature data generated as a result of digitally signing the encrypted internal data by the MyEllty-SHA-1 mode, and data 653 showing ciphertext data generated as a result of encrypting data "Name . . . 1998. 7. 10" in the internal data in FIG. 15 by the MyEllty-DES-CBC mode.

As described above, in the data communication system 1 of the present invention, a document, sent from the server apparatus 4 to the client apparatus 2 for producing a display which urges the user of the client apparatus 2 to input a message, includes an indication for a conversion type (whether to perform encryption/digital signature and which encryption/digital signature method should be used) for secret communication of an input message in the client apparatus 2. With this construction, the client apparatus 2 converts (encrypts and/or digitally signs) the input message according to the conversion type indicated by the server apparatus 4 and sends the converted message to the server apparatus 4. The server apparatus 4 decrypts the received message and/or verifies a digital signature of the received message as inverse conversion to obtain the original message.

Thus, in the data communication system 1 of the present invention the server apparatus 4 can determine the conversion type for secret communication based on information on the use of the client apparatus 2, such as user attribute information. This can be achieved by the server apparatus 4, after receiving the information on the use of the client apparatus 2, sending a message input form creation document which includes an indication for a conversion type associated with the received information to the client apparatus 2.

While the plurality of elements (name, address, date) in the internal data are converted based on the same conversion type in the above embodiment, a conversion type may instead be specified for each of the plurality of elements using more extension tags, so that each element will be processed differently.

Also, while an encryption variable is used to specify whether to perform encryption/digital signature and which encryption/digital signature method should be used in the above embodiment, the encryption variable may also be used to specify a type of a key or a combination of keys to be used and encryption/digital signature methods other than those used in the above embodiment.

Also, the server apparatus 4 in the above embodiment selects either a document that specifies an encryption variable indicating an encryption/digital signature method or a document that does not specify an encryption variable, depending on received user attribute information of the client apparatus 2. Alternatively, the server apparatus 4 may independently select a document to be sent to the client apparatus 2 based on a factor, such as a date, a day of a week, and a random number, without depending on data sent from the client apparatus 2.

While an encryption variable takes one of three values ("ONLY", "MIC-CLEAR", and "ENCRYPTED") in the above embodiment, the encryption variable can take more than three values in a case where the number of available encryption/digital signature methods is increased.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A message receiving apparatus for receiving messages from a message transmitting apparatus, comprising:

first receiving means for receiving first data concerning a use condition of the message transmitting apparatus from the message transmitting apparatus;

first generating means for generating second data for producing a display which urges a user of the message transmitting apparatus to input a message;

second generating means for generating third data for specifying a conversion type for secret communication of the message according to the received first data;

transmitting means for transmitting the second data and the third data to the message transmitting apparatus; and second receiving means for receiving the message from the message transmitting apparatus after the second data and the third data have been transmitted to the message transmitting apparatus, wherein the second data is written in a document description language format, and the third data is written within the second data using tags that extend the document description language format.

2. The message receiving apparatus of claim 1, further comprising associating means for associating the first data with conversion type information that indicates whether to perform encryption, which encryption method should be used if performing the encryption, whether to perform digital signature, and which digital signature method should be used if performing the digital signature, wherein the use condition of the message transmitting apparatus shown by the first data corresponds to an attribute of the user of the message transmitting apparatus, and wherein the second generating means generates the third data according to the conversion type information associated with the first data.

3. The message receiving apparatus of claim 2, further comprising storing means for storing fourth data showing key information necessary for the message transmitting apparatus to perform the encryption, wherein the transmitting means transmits the second data, the third data, and the fourth data to the message transmitting apparatus.

4. The message receiving apparatus of claim 1, further comprising reconverting means for reconverting the message received by the second receiving means.

5. The message receiving apparatus of claim 1, wherein the conversion type specified in the third data indicates whether to perform encryption and, if the encryption is to be performed, indicates one of encryption methods set in advance in the message transmitting apparatus.

6. The message receiving apparatus of claim 1, wherein the conversion type specified in the third data indicates whether to perform digital signature and, if the digital signature is to be performed, indicates one of digital signature methods set in advance in the message transmitting apparatus.

7. A message transmitting apparatus for transmitting messages to a message receiving apparatus, comprising:

acquiring means for acquiring first data concerning a use condition of the message transmitting apparatus;

first transmitting means for transmitting the first data to the message receiving apparatus;

receiving means for receiving, from the message receiving apparatus, second data for producing a display which urges a user to input a message and third data, generated according to the first data, for specifying a conversion type for secret communication of the message;

displaying means for producing the display according to the second data;

inputting means for receiving the message inputted by the user in response to the display;

converting means for converting the input message according to the third data; and second transmitting means for transmitting the converted message to the message receiving apparatus, wherein the second data is written in a document description language format, and the third data is written within the second data using tags that extend the document description language format.

8. The message transmitting apparatus of claim 7, further comprising associating means for associating the third data with conversion type information that indicates whether to perform encryption, which encryption method should be used if performing the encryption, whether to perform digital signature, and which digital signature method should be used if performing the digital signature, wherein the converting means converts the input message according to the conversion type information associated with the third data.

9. The message transmitting apparatus of claim 8, further comprising:

preventing means for preventing the third data written using the tags from being displayed.

10. The message transmitting apparatus of claim 8, wherein the receiving means receives fourth data showing key information necessary for performing the encryption from the message receiving apparatus together with the second data and the third data, and wherein the converting means converts the input message according to the third data and the fourth data.

11. The message transmitting apparatus of claim 7, wherein the conversion type specified in the third data indicates whether to perform encryption and, if the encryption is to be performed, indicates one of encryption methods set in advance in the message transmitting apparatus.

12. The message transmitting apparatus of claim 7, wherein the conversion type specified in the third data indicates whether to perform digital signature and, if the digital signature is to be performed, indicates one of digital signature methods set in advance in the message transmitting apparatus.

13. A message communicating method for communicating messages between a message transmitting apparatus and a message receiving apparatus, comprising:

an acquiring step for acquiring first data concerning a use condition of the message transmitting apparatus in the message transmitting apparatus;

a first communicating step for transmitting the first data from the message transmitting apparatus to the message receiving apparatus;

a first generating step for generating, in the message receiving apparatus, second data for producing a display which urges a user of the message transmitting apparatus to input a message;

a second generating step for generating third data in the message receiving apparatus for specifying a conversion type for secret communication of the message according to the first data;

a second communication step for transmitting the second data and the third data from the message receiving apparatus to the message transmitting apparatus;

a displaying step for producing the display in the message transmitting apparatus according to the second data;

an inputting step for receiving the message inputted by the user in response to the display in the message transmitting apparatus;, a converting step for converting the input message in the message transmitting apparatus according to the third data; and a third communicating step for transmitting the converted message from the message transmitting apparatus to the message receiving apparatus, wherein the second data is written in a document description language format, and the third data is written within the second data using tags that extend the document description language format.

14. A message receiving method for receiving messages from a message transmitting apparatus, comprising:

a first receiving step for receiving first data concerning a use condition of the message transmitting apparatus from the message transmitting apparatus;

a first generating step for generating second data for producing a display which urges a user of the message transmitting apparatus to input a message;

a second generating step for generating third data for specifying a conversion type for secret communication of the message according to the received first data;

a transmitting step for transmitting the second data and the third data to the message transmitting apparatus; and a second receiving step for receiving the message from the message transmitting apparatus after the second data and the third data have been transmitted to the message transmitting apparatus, wherein the second data is written in a document description language format, and the third data is written within the second data using tags that extend the document description language format.

15. A message transmitting method for transmitting messages to a message receiving apparatus, comprising:

an acquiring step for acquiring first data concerning a use condition of the message transmitting apparatus;

a first transmitting step for transmitting the first data to the message receiving apparatus;

a receiving step for receiving, from the message receiving apparatus, second data for producing a display which urges a user to input a message and third data, generated according to the first data, for specifying a conversion type for secret communication of the message;

a displaying step for producing the display according to the second data;

an inputting step for receiving the message inputted by the user in response to the display;

a converting step for converting the input message according to the third data; and a second transmitting step for transmitting the converted message to the message receiving apparatus, wherein the second data is written in a document description language format, and the third data is written within the second data using tags that extend the document description language format.

16. A computer-readable storage medium storing a program that when implemented on a computer will realize a message receiving apparatus for receiving messages from a message transmitting apparatus, the program comprising:

a first receiving step for receiving first data concerning a use condition of the message transmitting apparatus from the message transmitting apparatus;

a first generating step for generating second data for producing a display which urges a user of the message transmitting apparatus to input a message;

a second generating step for generating third data for specifying a conversion type for secret communication of the message according to the received first data;

a transmitting step for transmitting the second data and the third data to the message transmitting apparatus; and a second receiving step for receiving the message from the message transmitting apparatus after the second data and the third data have been transmitted to the message transmitting apparatus, wherein the second data is written in a document description language format, and the third data is written within the second data using tags that extend the document description language format.

17. A computer-readable storage medium storing a program that when implemented on a computer will realize a message transmitting apparatus for transmitting messages to a message receiving apparatus, the program comprising:

an acquiring step for acquiring first data concerning a use condition of the message transmitting apparatus;

a first transmitting step for transmitting the first data to the message receiving apparatus;

a receiving step for receiving, from the message receiving apparatus, second data for producing a display which urges a user to input a message and third data, generated according to the first data, for specifying a conversion type for secret communication of the message;

a displaying step for producing the display according to the second data;

an inputting step for receiving the message inputted by the user in response to the display;

a converting step for converting the input message according to the third data; and a second transmitting step for transmitting the converted message to the message receiving apparatus, wherein the second data is written in a document description language format, and the third data is written within the second data using tags that extend the document description language format.

\* \* \* \* \*